C. H. LOGUE.
MACHINE FOR TESTING THE OPERATING QUALITIES OF BEVEL GEARS.
APPLICATION FILED JULY 16, 1917.
1,363,799.
Patented Dec. 28, 1920.
2 SHEETS—SHEET 2.
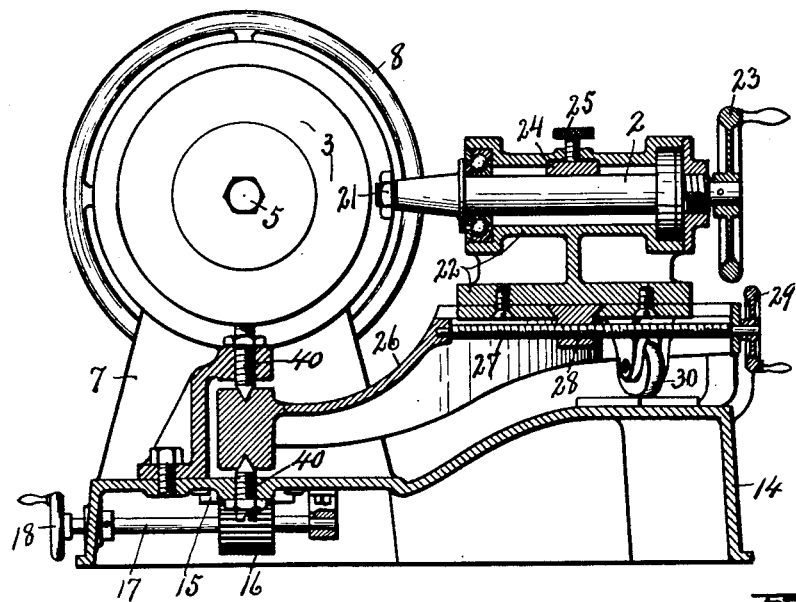
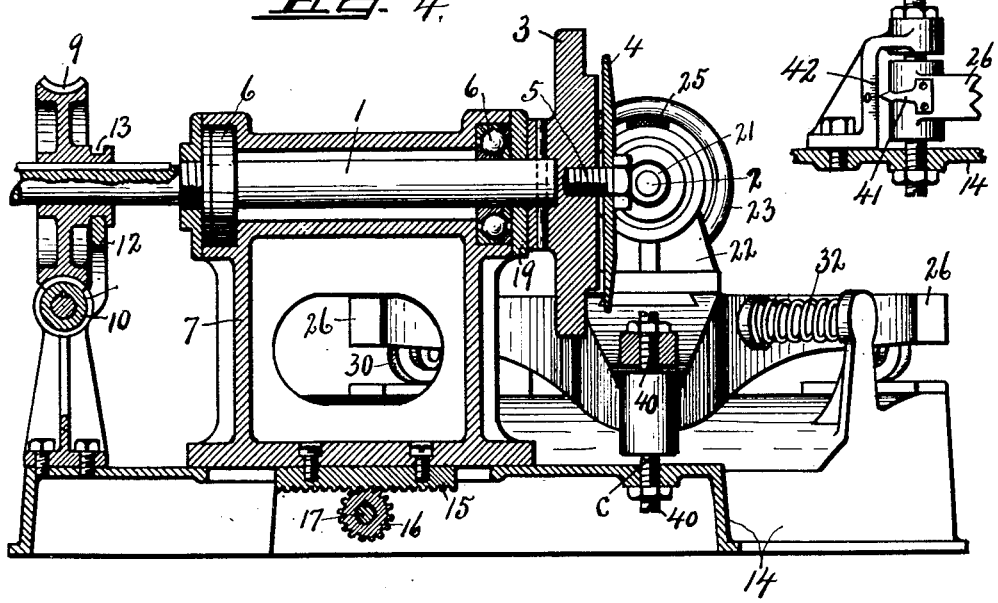

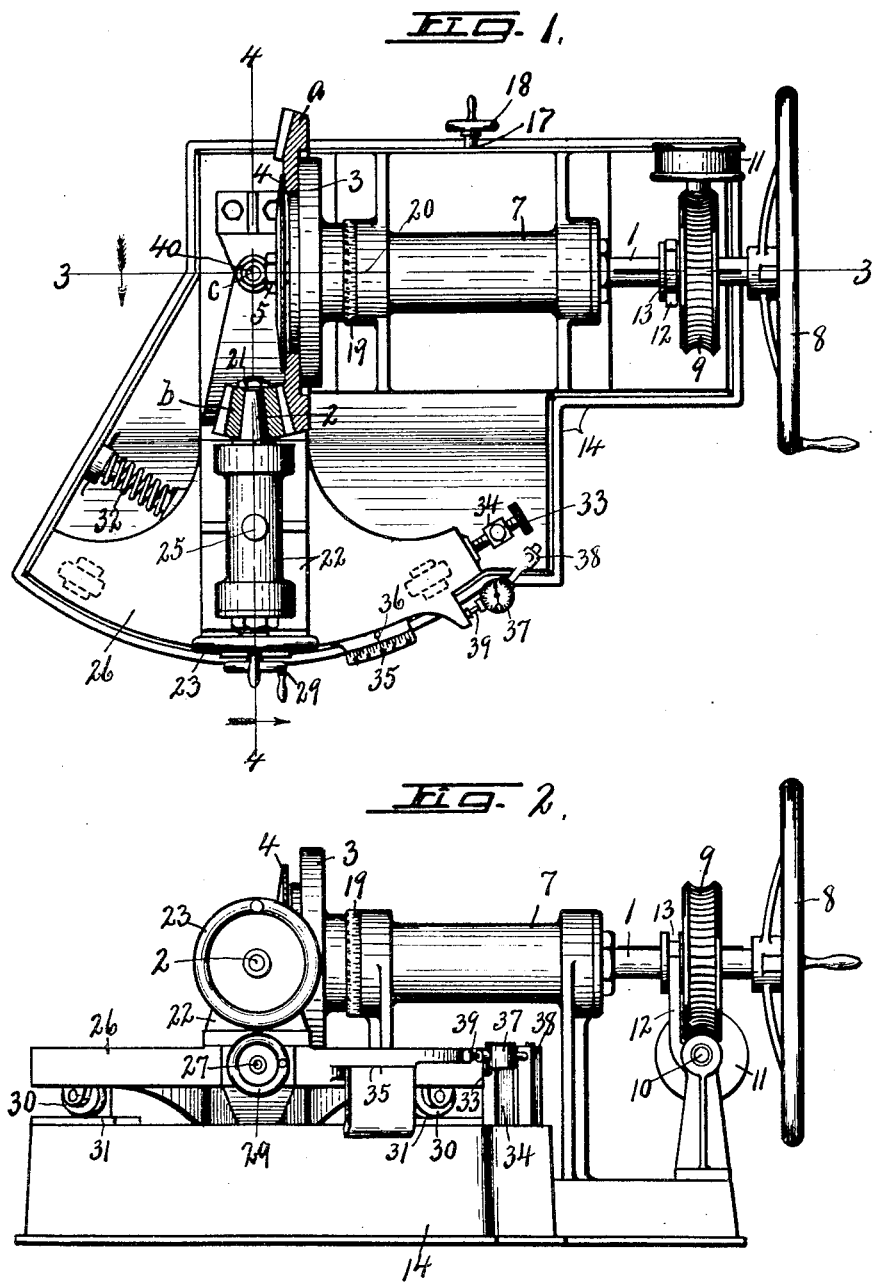

UNITED STATES PATENT OFFICE.

CHARLES H. LOGUE, OF SYRACUSE, NEW YORK.

MACHINE FOR TESTING THE OPERATING QUALITIES OF BEVEL-GEARS.

1,363,799.    Specification of Letters Patent.    Patented Dec. 28, 1920.

Application filed July 16, 1917. Serial No. 180,793.

*To all whom it may concern:*

Be it known that I, CHARLES H. LOGUE, a citizen of the United States of America, and resident of Syracuse, in the county of Onondaga, in the State of New York, have invented new and useful Improvements in Machines for Testing the Operating Qualities of Bevel-Gears, of which the following, taken in connection with the accompanying drawings, is a full, clear, and exact description.

This invention relates to certain improvements in machines for testing the operating qualities of bevel gears, in general, but more particularly the differential driving gears of motor vehicles in which the highest degree of working efficiency is demanded.

These gears are first cut from soft or untempered steel to conform to certain prescribed formulæ necessary to give the required efficiency and are subsequently tempered or hardened to increase their resistance to wear and breakage so that aside from the liability of error in cutting, there is always present the liability of distortion by shrinkage or warping in hardening.

The main object, therefore, is to provide a simple and commercially practicable machine by which any and all imperfections or errors in the manufacture and running efficiency of gears of this character may be easily and expeditiously detected, located and measured so that such error or imperfection may, if possible, be corrected without undue loss of time or labor.

Other objects and uses relating to specific parts of the machine will be brought out in the following description.

In the drawings—

Figure 1 is a top plan of a device for carrying out the objects of my invention, showing in section intermeshing bevel gears mounted therein for testing purposes.

Fig. 2 is a front elevation of the same machine, omitting the gears.

Fig. 3 is a longitudinal vertical sectional view taken on line 3—3, Fig. 1.

Fig. 4 is a transverse vertical sectional view taken on line 4—4, Fig. 1.

Fig. 5 is a detail elevation of the adjustable pivotal connections between the swinging frame and its supporting base.

Gears of this character are assumed to operate at a definite shaft angle and with a predetermined amount of backlash for clearance according to their pitch angles so that the intermeshing teeth will contact throughout their entire lengths without lost motion or irregular rate of acceleration.

The device shown is for testing the accuracy of the gears to meet these various requirements, and is set to test a pair of coöperative gears —$a$— and —$b$— similar to those commonly employed in driving the differentials and axles of motor vehicles and, therefore, disposed at a shaft angle of, in this instance, 90°.

In making the test the gears are mounted upon separate mandrels or arbors —1— and —2—, each coaxial with its corresponding mandrel and adapted to rotate therewith, said mandrels being arranged so that their produced axes intersect each other and are adjustable axially to bring the apexes of the pitch angles of both gears into coincidence with each other and with the point of intersection of the axes of the mandrels.

One of the mandrels, as —2—, has an independent adjustment about the apex of the pitch angle of its gear and, therefore, about the point of intersection of said axes when the gears are in operative mesh to enable said mandrel to respond to the axial adjustment of the other mandrel —1— until the meshing teeth of both gears are caused to contact throughout their entire lengths as the first step in the several tests to determine the accuracy of the pitch angles and relative shaft-angle of said gears.

In order that the gears may operate freely, it is necessary to cut the channels slightly deeper than the operating faces to provide the desired clearance or backlash, the amount of clearance being predetermined according to the pitch angle of the gear.

That is, a gear of, say, $14\frac{1}{2}°$ angle would require a minimum clearance or backlash of .006″ and would operate with the required degree of efficiency with a maximum "run-out" of .016″ through a rotary movement of not less than 180°.

It, therefore, follows that if the mandrel —1— with its gear —$a$— is set to its zero position with the apex of said gear at the point of intersection of both gear-axes and the mandrel —2— with its pinion —$b$— is rocked toward the gear —1— as far as the meshing teeth will allow, the shaft-angle between the axes of the gears should be slightly less than 90°, the difference being determined by a suitable scale, hereinafter described, and indicates the degree of backlash or clearance and also determines at a glance whether or not the gears are of the proper shaft angle and pitch angle.

This angular or rocking motion of the mandrel —2— is also utilized to, in a manner presently described, determine the accuracy of contact of the teeth throughout their lengths and is also used in conjunction with a circular scale on the mandrel —1— for determining the accuracy of runout of the gears.

The gear —a— consists, in this instance, of a ring and is clamped to a face-plate —3— on one end of the mandrel —1— by means of a disk —4— and screw —5— to rotate therewith.

The mandrel —1— is journaled in anti-friction bearings —6— on a carriage —7— and may be rotated by a hand wheel —8— or by power through the medium of a gear —9— and worm —10— which is driven by a pulley —11— from any available source of power, not shown.

The gear —9— is feathered on the mandrel —1— to permit the latter to move axially relatively thereto, said gear being held against axial movement by a forked arm —12— engaging in an annular groove —13— in the hub of said gear.

The carriage —7— is movable parallel with the axis of the mandrel —1— along and upon suitable ways on the upper face of the main supporting frame or bed —14—, the means for effecting said movement consisting, in this instance, of a rack —15— and a pinion —16—.

The rack —15 is secured to the under side of the carriage —7—, while the pinion is secured to a shaft —17— having a hand wheel —18— by which it may be rotated at will to adjust the gear —a— to its testing position.

A ring or collar —19— is secured to the mandrel —1— to revolve therewith close to the inner end of the carriage —7— and is provided on its periphery with graduations or scales numbered in sequence from zero to —360° adapted to register with a fixed index —20— on the carriage to indicate the degree of rotation of said gear.

The pinion —b— is secured to one end of the mandrel —2— by means of a tight taper fit and a clamping nut —21—, the mandrel —2— being journaled in anti-friction bearings on a supporting member —22— and is provided with a hand wheel —23— by which it may be rotated if desired, or it may be locked against rotation by means of a friction block —24— and screw —25— on the member —22— to hold both gears against rotation as when setting the device preparatory to making the tests or to determine the exact part of the gear which is out of true.

The member —22— is movable along and upon suitable ways on the upper face of a laterally swinging frame —26— parallel with the axis of the mandrel —2— by means of a screw shaft —27— and nut —28—.

The shaft —27— is journaled in suitable bearings on the frame —26— and is provided with a hand wheel —29— by which it may be rotated while the nut —28— is secured to the underside of the slide —22— and engaged with the threaded shaft to permit the pinion —b— to be properly adjusted to the gear —a— for testing purposes.

The frame —26— is pivoted to the base or bed —14— to swing about an axis —c— which is coincident with the apex of the pinion —b—, and during the testing operations is also coincident with the point of intersection of the axes of both gears as in actual running relation, said frame being further supported by rollers —30— which are movable along ways —31— on the upper face of the bed —14— to permit it to swing with the utmost freedom and sensitiveness.

A light coil spring —32— serves to rock the frame —26— toward the carriage —7— to yieldingly press the pinion —b— into engagement with the gear —a—, but may be opposed by a stop screw —33— which is mounted on a turning post —34— in the bed —14— so that it may be moved into and out of the path of said frame or to and from its holding position.

This stop is employed more particularly for resetting the frame to its zero position with the axis of its pinion at an angle of 90° relatively to that of the gear —a— or when turned from its operative position allows the frame to be operated by the spring —32— to determine the degree of backlash and certain imperfections in the runout of the gears.

This degree of backlash and also the running quality of the gears may be more accurately determined in degrees or fractions thereof by means of a scale or vernier —35— on the bed —14— coöperating with a fixed index —36— on the frame —26—, said scale being graduated in opposite directions from a zero point which corresponds to the 90° angle of the gear mandrels, or a similar reading may be produced by the use of a dial-meter, as —37—, Fig. 2.

This dial-meter is supported by a post —38— on the base —14— and is provided with a plunger arm —39— engaging the frame —7— to transmit motion from said frame to the meter in a manner similar to that commonly employed in dial counters and not necessary to further illustrate or describe.

The scale —35— is purposely placed at a considerably greater radius from the axis of movement of the frame —26— than the meshing faces of the gears —a— and —b— so that the slightest degree of movement of said frame, as may be produced by certain imperfections in the gears during their rotation, may be more readily detected and measured by said scale by reason of the increased length of arc through which the scale moves as compared with that through which the pinion is moved.

It is now evident that in the initial setting of the machine to bring the gears into operative mesh as described, the scale —35— will determine at once the pitch angle and also the degree of backlash of said gears and if these measurements are found to be within acceptable limits of the prescribed formula the further tests to obtain the effective runout of the pitch lines of both gears may be continued.

This latter test is made by revolving the gears and noting on the scale —35— any angular or swinging movement of the frame —26— and pinion-supporting mandrel thereon to either side of its zero position together with the degree of angular roll of the gear —a— as determined by the circular scale on the collar —19— which is assumed to start from a normal zero position in making the further tests referred to.

The measurements indicated by these two angular movements may be taken as a basis for calculating the working efficiency of the gears well-known to those skilled in this art and not necessary to herein describe, it being also understood that certain limitations of error from an absolute true runout, according to the pitch angle of the gears, is allowable without appreciably affecting the practically perfect running efficiency of the gears and, therefore, the calculations for such efficiency are usually based upon the maximum errors beyond certain prescribed limitations for the particular gears under test.

It sometimes happens that the teeth will become distorted slightly from their true radial lines, in which case it would be impossible to bring the teeth of the two gears into perfect mesh with their apexes coincident, and in order to establish such perfect mesh, it would be necessary to adjust one or the other of the gears so that its apex would be to one side of that of the other gear, or at an angle to its normal axis, and one of the objects of this invention is to detect the amount of such offset necessary to "bottom" the intermeshing teeth.

For this purpose, the hub of the swinging arm —26— is held between opposed adjusting screws —40— on the main frame or bed —14— with sufficient clearance at the bearing points so that this end of the swinging frame may be slightly adjusted about the bearing points between the rollers —30— and supporting bed —14— until the intermeshing teeth of the gears properly bottom one upon the other, thereby shifting the spindle —2— and pinion carried thereby at an angle to its normal axis which would bring the apex of the pinion to one side of that of the gear, the amount of such adjustment being indicated by a pointer —41— and scale —42—, Fig. 5.

Now, by rotating the gear slowly will determine the location of the teeth which may be distorted from their normal radial lines, while the scale —42— will give the amount of such distortion which enables the operator to remedy the error by such methods as may be most expeditious and accurate.

What I claim is:

1. In a bevel gear testing machine, devices for supporting a pair of bevel gears in mesh with each other, with their axes in the same plane so as to intersect each other when produced, one of said devices being movable in said plane about the point of intersection of said axes.

2. In a bevel gear testing machine, devices for supporting a pair of bevel gears in mesh with each other, with their axes in one and the same plane, and intersecting each other when produced, whereby certain imperfections in the mesh of the gears will cause said movement when the gears are rotated, and means for indicating the amount of said movement.

3. In a bevel gear testing machine, devices for supporting a pair of coöperative rotatable bevel gears in mesh, one of said devices being movable about an axis intersecting the produced axis of the other gear, operable about the first named axis by certain imperfections of mesh of the gear, and means for adjusting one of the devices axially of its gear.

4. In a bevel gear testing machine, devices for supporting a pair of coöperative rotatable bevel gears in mesh, one of said devices being movable about an axis intersecting the produced axis of the other gear, operable about the first named axis by certain imperfections of mesh of the gear, and separate adjusters for moving said devices axially of their respective gears each in relation to the other.

5. In a bevel gear testing machine, devices for supporting a pair of rotatable bevel gears in mesh with each other, with their axes in one and the same plane and intersecting each other at a certain point when produced, one of said devices being movable about said point, and means for adjusting the movable device axially of its gear.

6. In a bevel gear testing machine, devices for supporting a pair of coöperative rotatable bevel gears in mesh, one of said devices being movable about an axis intersecting the produced axis of the other gear and operable by certain imperfections in the mesh of the gears will oscillate the movable device, and means to indicate the degree of said oscillation.

7. In a bevel gear testing machine, devices for supporting a pair of coöperative rotatable bevel gears in mesh, one of said devices being movable about an axis intersecting the produced axis of the other gear, and operable about the first named axis by certain imperfections in the mesh of the gears, yielding means for forcing the movable device in a direction which will cause its gear to engage the other gear, and a stop coacting with said device to limit its movement by said yielding means.

8. In a bevel gear testing machine, devices for supporting a pair of coöperative bevel gears in mesh, one of said devices being movable about an axis intersecting the produced axis of the other gear, yielding means for forcing the movable device in a direction which will cause its gear to engage the other gear, and a stop coacting with said device to limit its movement by said yielding means, said stop being adjustable to and from its holding position.

9. In a device of the character described, the combination of a pair of gear holders, each having means for rotating its gear, one of the holders having an angular movement relatively to the axis of the other gear, and operable by certain imperfections of mesh of the gears, and yielding means for operating one holder to hold its gear in mesh with the other gear.

10. In a device of the character described, the combination of a pair of bevel gear holders, each having means for rotating its gear, one of the holders being capable of angular movement so as to change the angular relation of the gears, yielding means for operating the movable holder to hold its gear in mesh with the other gear, and means for measuring angular deviations of the movable holder during the rotation of the gears in mesh.

11. In a bevel-gear testing device, the combination of mandrels for normally supporting the gears in mesh in the same plane, a pivoted support for one of the mandrels operable about the axes of the pivots by certain imperfections of mesh of the gears, means for adjusting said support to different angles relative to said plane, and means for indicating the amount of such adjustment from a certain normal position.

12. In a machine for testing bevel gears, the combination of a pair of rotary mandrels for supporting a pair of bevel gears in mesh with each other and having their axes disposed in substantially the same plane to intersect each other at a certain point when produced, a support for one of the mandrels pivoted to swing about an axis passing through said point, said support being spring pressed in one direction to hold its gear in mesh with the companion gear.

13. In a device of the character described a pair of rotary bevel-gear holders, each adjustable axially, one of said holders being capable of angular movement so as to change the angular relation of the gears and means for measuring the amount of said angular movement from a predetermined position.

In witness whereof I have hereunto set my hand this 7th day of July, 1917.

CHARLES H. LOGUE.

Witnesses:
H. E. CHASE,
ALICE M. CANNON.